Patented Feb. 7, 1950

2,496,650

UNITED STATES PATENT OFFICE 2,496,650

ESTERS OF HYDROXYALKYL AROMATIC SULFONAMIDES

David Aelony, Minneapolis, Minn., assignor to General Mills, Inc., a corporation of Delaware No Drawing. Application January 26, 1946, Serial No. 643,748

4 Claims. (Cl. 260—402)

The present invention relates to esters of hydroxyalkyl aromatic sulfonamides. Members of this group of compounds are useful as plasticizers, waxes, and the like.

In general, the compounds contemplated by the present invention may be represented by the following structural formula:

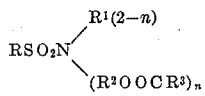

in which R is an aryl radical such as phenyl, toluyl, xylyl, naphthyl, or derivatives thereof; $R^1$ is hydrogen, alkyl, aryl, or alkanol; $R^2$ is alkylene or substituted alkylene; and $R^3$ is alkyl, aryl, or aralkyl. The letter $n$ may represent 1 or 2.

The lower esters such as the acetates, butyrates, crotonates, and the like are liquids and have been found to be useful as plasticizers for polyvinyl resins, particularly polyvinyl chloride resins. The higher esters such as the higher fatty acid esters, for example palmitates, stearates, and the like have been found to be useful as waxes. These waxes are definite chemical compounds with definite properties of solubility, melting point, etc., and are, therefore, more uniform and convenient to use in emulsions and gel polishes than the natural waxes which are variable in their properties.

These compounds may be prepared by reacting an aromatic sulfonyl halide with an alkanolamine to form the hydroxyalkyl aromatic sulfonamide which may then be treated with an acylating agent to form the ester. It will be apparent that the alkanolamine may be a mono- or dialkanolamine, and in the event that a dialkanolamine is employed, it will be apparent that this may subsequently be partially or completely esterified. The reaction conditions which are suitable are illustrated by the following examples.

EXAMPLE 1

*N,N-di-beta-hydroxyethyl benzene sulfonamide distearate*

202 g. benzene sulfonchloride were slowly added to an agitated cold solution of 65 g. sodium carbonate and 150 g. diethanolamine in 400 cc. of water. The resultant mixture gradually came to a boil and was refluxed for 1 hour, whereupon it was allowed to stand and was separated into two layers. The lower layer was extracted with chloroform, washed with a little cold water, dried over $Na_2SO_4$, filtered and evaporated in vacuo on a steam bath. 238 g. of a heavy liquid $N_D^{30}$ 1.5457 were obtained. The percent N found was 5.60 (theory for N,N-di-beta-hydroxyethyl benzene sulfonamide, 5.71); hydroxyl number found was 420.7 (theory 458); percent free amino group, less than 0.4%.

165 g. of a commercial stearic acid (Neo Fat 1–65), 73.5 g. N,N-di-beta-hydroxyethyl benzene sulfonamide, 300 cc. xylene and 5 g. p-toluene sulfonic acid hydrate were agitated and refluxed over a Starck and Dean tube. In five hours, 11 cc. of water (theory for the distearate, 12.5 cc.) were collected in the trap. The product was dried in vacuo on a steam bath yielding 220 g. of a solid M. P. 75–6° C., percent N found 1.74 (theory 1.81), acid No. 13.5. Wax gels containing 25% solids and 75% solvent were made using turpentine and also with mineral spirits. These wax gels imparted beautiful polishes to shoes, furniture, and cars.

EXAMPLE 2

*N-beta-hydroxyethyl benzene sulfonamide stearate*

40 g. monoethanolamine and 53 g. sodium carbonate were dissolved in 300 cc. $H_2O$, and 113 g. of benzene sulfonchloride were then added slowly. The mixture was heated on a steam bath and agitated occasionally for four hours, at which time two layers were formed on standing. The lower layer was extracted with chloroform and the chloroform solution was dried over sodium sulfate, filtered, and evaporated in vacuo yielding 123 g. (93% theory) of a viscous liquid which upon fractionation in vacuo yielded 106 g. liquid of pale straw color, $N_D^{30}$ 1.5515, percent N found 6.97 (theory for N-beta-hydroxyethyl benzene sulfonamide, 6.96); hydroxyl number found 555.5 (theory 556); boiling point 172° C. at 40 microns pressure.

100 g. N-beta-hydroxyethyl benzene sulfonamide, 140 g. of a commercial stearic acid (Neo Fat 1–65), 2.5 g. p-toluene sulfonic acid monohydrate and 400 cc. xylene were agitated and refluxed over a Starck and Dean tube. In 2½ hours the reaction was complete, and nearly 9 cc. water was collected. Xylene was removed by distillation in vacuo. The residue was poured into dilute ammonium hydroxide solution; then acidified with HCl, filtered, washed with water until neutral, then with a little alcohol and allowed to dry. It was recrystallized twice from alcohol yielding 71% of a material M. P. 79–79.5° C., percent N found 2.97 (theory for the stearate, 3.02); acid number 4.7. The product yielded a softish gel with 75% turpentine, but a very firm one with 75% mineral spirits. Excellent shines on shoes, furniture, and cars were obtained with each.

EXAMPLE 3

*N-beta-hydroxyethyl p-toluene sulfonamide stearate*

250 g. monoethanolamine were dissolved in 1 liter of water. 381 g. p-toluene sulfonchloride were added with agitation. The temperature went up to 65° C. The reaction mixture was brought up to a boil and was allowed to stand overnight. The lower layer was dissolved in chloroform, washed with a little cold water, dried over sodium sulfate, filtered and evaporated. It was distilled in vacuo yielding 357 g. material, boiling point 208° C. at 40 microns' pressure. Two days after distillation it solidified.

134 g. N-beta-hydroxyethyl p-toluene sulfonamide, 175 g. of a commercial stearic acid (Neo Fat 1-65) and 200 cc. xylene were agitated and refluxed under a Starck and Dean tube for 3½ hours. The temperature was allowed to go up to 230° C. by gradually draining the distillate. 11.5 cc. water were collected (theory for the stearate, 11.2 cc.). The solvent was stripped in vacuo. The product a dark brown solid of buttery consistency was obtained in a 295 g. yield (theory 298 g.), percent N found 2.89 (theory 2.97). The product was extremely soluble in most ordinary organic solvents such as benzene, alcohol, carbon tetrachloride, etc., with the exception of aliphatic hydrocarbons.

EXAMPLE 4

*N,N-di-beta-hydroxyethyl p-toluene sulfonamide distearate*

210 g. diethylanolamine were dissolved in 700 cc. water and the mixture was heated to 70° C. 190.5 g. p-toluene sulfonchloride were added at once. A violent reaction accompanied by boiling took place, and a homogeneous solution resulted. On cooling, a dark lower layer separated which solidified at 45° C. It was filtered and recrystallized from methanol yielding 156 g. white crystals M. P. 101.5–103.5° C. and 42 g. white powder (from mother liquor) M. P. 97.5–100° C. The total yield was 76.5% theory.

129.5 g. N,N-di-beta-hydroxyethyl p-toluene sulfonamide, 280.5 g. of a commercial stearic acid (Neo Fat 1-65), 1 g. p-toluene sulfonic acid monohydrate and 250 cc. xylene were refluxed over a Starck and Dean tube for two hours. A total of 18 cc. of water was collected in the trap. The product was poured into 1.5 liters butanol, was allowed to stand overnight and filtered. After five days of air drying 353.5 g. of the product (92% yield) M. P. 68.5–69.5° C. were obtained. Percent N found 1.765 (theory for the stearate, 1.78), acid number 2.4. When melted and allowed to solidify a beautiful hard shiny solid is formed (penetration in 30 sec. with a 200 g. load, ASTM needle, was 3, while it was 1 for carnauba No. 1). Fine 25% wax gels were made using turpentine or mineral spirits as solvents. The gels possess excellent polishing properties.

EXAMPLE 5

*N,N-di-beta-hydroxyethyl p-toluene sulfonamide diacetate*

55 g. N,N-di-beta-hydroxyethyl p-toluene sulfonamide and 55 g. acetic anhydride were warmed up under reflux. There was a very vigorous reaction which soon subsided. Refluxing was continued 3½ hours. The reaction mixture was then refluxed a few minutes with dilute sodium carbonate solution, cooled and extracted with ether. The ether extract was washed with water, dried over sodium sulfate, filtered and evaporated yielding 64 g. of a liquid $N_D^{30}$ 1.5103; saponification equivalent found 177.7 (theory for the diacetate 176.5); percent N found 4.02 (theory 3.97).

EXAMPLE 6

*N,N-di-beta-hydroxyethyl p-toluene sulfonamide dibutyrate*

100 g. N,N-di-beta-hydroxyethyl p-toluene sulfonamide, 70 g. n-butyric acid, 250 cc. xylene and 0.5 g. of p-toluene sulfonic acid hydrate were agitated and refluxed over a Starck and Dean tube for 4½ hours. 14 cc. of water were collected (theoretical). Xylene was distilled off and the residue was distilled in vacuo with slight decomposition. 118 g. distilled at 238° C. at 0.4 mm., $N_D^{30}$ 1.5002; percent N found 3.52 (theory 3.51).

EXAMPLE 7

*N,N-di-beta-hydroxyethyl beta-naphthalene sulfonamide distearate*

100 g. beta-naphthalene sulfonchloride, 110 g. diethanolamine, and 300 cc. water were stirred two hours on a steam bath. The cooled product was filtered and recrystallized from methanol yielding 77 g., M. P. 92–4° C.; 9 g., M. P. 82–6° C. and 46 g. material of buttery consistency obtained by evaporation of mother liquor.

70.5 g. N,N-di-beta-hydroxyethyl beta-naphthalene sulfonamide, 134 g. of a commercial stearic acid (Neo Fat 1-65), 1 g. toluene sulfonic acid monohydrate and 300 cc. of xylene were agitated and refluxed over a Starck and Dean tube for two hours. 8.5 cc. water were collected. The product was recrystallized from butanol and then from methanol yielding 153 g. wax, M. P. 78.5–80° C. Wax gels prepared from the wax had good polishing properties.

While numerous examples have been given it will be apparent that the invention is not limited thereto but that numerous other modifications will suggest themselves to those skilled in the art. It is to be understood, therefore, that the invention is to be limited only by the following claims.

I claim as my invention:

1. An ester of a hydroxyalkyl aromatic sulfonamide having the following structural formula:

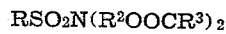

in which R is an aryl radical, $R^2$ is a short-chain alkylene group, and the group $R^3CO$ is the acyl group of a higher fatty acid.

2. An ester of a hydroxyalkyl aromatic sulfonamide having the following structural formula:

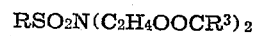

in which R is an aryl radical and $R^3$ is a long-chain saturated aliphatic group.

3. A compound according to claim 2 in which $R^3$ is $C_{17}H_{35}$.

4. N,N-dihydroxyethyl p-toluene sulfonamide distearate.

DAVID AELONY.

(References on following page)

REFERENCES CITED

The following references are of record in the file of this patent:

UNITED STATES PATENTS

| Number | Name | Date |
|---|---|---|
| 2,036,932 | Felix et al. | Apr. 7, 1936 |
| 2,097,414 | Kharasch et al. | Oct. 26, 1937 |
| 2,123,718 | De Groote | July 12, 1938 |
| 2,353,694 | De Groote | July 18, 1944 |

FOREIGN PATENTS

| Number | Country | Date |
|---|---|---|
| 512,460 | Great Britain | Sept. 18, 1939 |